United States Patent
Knatt et al.

(10) Patent No.: US 10,054,352 B2
(45) Date of Patent: Aug. 21, 2018

(54) METHODS AND APPARATUSES FOR CONTROLLING THE HARVEST CYCLE OF AN ICE MAKER USING A HARVEST SENSOR AND A TEMPERATURE SENSOR

(71) Applicant: True Manufacturing Co., Inc., O'Fallon, MO (US)

(72) Inventors: Kevin Knatt, St. Louis, MO (US); Steven Lee Trulaske, Sr., St. Louis, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 32 days.

(21) Appl. No.: 15/077,194

(22) Filed: Mar. 22, 2016

(65) Prior Publication Data

US 2016/0298893 A1    Oct. 13, 2016

Related U.S. Application Data

(60) Provisional application No. 62/145,294, filed on Apr. 9, 2015.

(51) Int. Cl.
*F25C 5/10* (2006.01)
*F25C 1/12* (2006.01)
(Continued)

(52) U.S. Cl.
CPC ............ *F25C 5/10* (2013.01); *F25B 47/022* (2013.01); *F25B 49/02* (2013.01); *F25C 1/12* (2013.01);
(Continued)

(58) Field of Classification Search
CPC .......... F25C 5/10; F25C 1/12; F25C 2600/04; F25C 2700/12; F25B 49/02; F25B 47/022; F25B 2600/2501; F25B 2700/21174; F25B 2700/21175; F25B 2341/065; F25B 2600/2513; Y02B 30/72
See application file for complete search history.

(56) References Cited

U.S. PATENT DOCUMENTS 4,938,030 A * 7/1990 Josten .................. F25C 1/12
                                                      62/126
5,042,263 A * 8/1991 Day .................... F25C 1/12
                                                      62/138
(Continued)

*Primary Examiner* — Emmanuel Duke
(74) *Attorney, Agent, or Firm* — Bryan Cave Leighton Paisner LLP

(57) ABSTRACT

An ice maker for forming ice having a refrigeration system, a water system and a controller. The refrigeration system includes a freeze plate in which ice is formed and a hot gas valve for harvesting the ice therefrom. A harvest sensor is triggered when at least a portion of the ice is harvested from the freeze plate and at least one temperature sensor measures a temperature that indicates that all of the ice has been harvested from the freeze plate. The temperature sensors may include a temperature sensor for measuring the refrigerant temperature at the evaporator outlet, the refrigerant temperature at the evaporator inlet, and/or the temperature of the freeze plate. The controller closes the hot gas valve in response from the triggering of the harvest sensor and the temperature measured by the temperature sensor(s) indicating that all of the ice has been harvested from the freeze plate.

2 Claims, 13 Drawing Sheets

(51) Int. Cl.
*F25B 47/02* (2006.01)
*F25B 49/02* (2006.01)

(52) U.S. Cl.
CPC . *F25B 2341/065* (2013.01); *F25B 2600/2501* (2013.01); *F25B 2600/2513* (2013.01); *F25B 2700/21174* (2013.01); *F25B 2700/21175* (2013.01); *F25C 2600/04* (2013.01); *F25C 2700/12* (2013.01); *Y02B 30/72* (2013.01)

(56) References Cited

U.S. PATENT DOCUMENTS

| | | | | |
|---|---|---|---|---|
| 5,129,237 A * | 7/1992 | Day | F25C 1/12 | 62/138 |
| 5,239,836 A * | 8/1993 | Sakai | F25C 1/12 | 261/DIG. 46 |
| 5,291,747 A * | 3/1994 | Sakai | F25C 1/12 | 62/135 |
| 5,477,694 A * | 12/1995 | Black | F25C 1/12 | 62/137 |
| 5,878,583 A | 3/1999 | Schlosser et al. | | |
| 5,901,561 A * | 5/1999 | Allison | F25C 1/12 | 62/126 |
| 6,125,639 A | 10/2000 | Newman et al. | | |
| 6,282,909 B1 | 9/2001 | Newman et al. | | |
| 6,988,373 B2 * | 1/2006 | Wakatsuki | F25C 1/12 | 62/233 |
| 2001/0039804 A1 * | 11/2001 | Newman | F25C 1/12 | 62/66 |
| 2005/0155360 A1 * | 7/2005 | Yoshida | F25C 1/12 | 62/135 |
| 2006/0042297 A1 * | 3/2006 | Wakatsuki | F25C 5/10 | 62/324.1 |
| 2008/0216490 A1 * | 9/2008 | Wakatsuki | F25C 1/12 | 62/74 |
| 2009/0219328 A1 * | 9/2009 | Godil | B41J 2/0057 | 347/19 |
| 2009/0320501 A1 * | 12/2009 | Morimoto | F25C 1/12 | 62/66 |
| 2015/0233623 A1 * | 8/2015 | Izadi-Zamanabadi | F25B 1/00 | 62/115 |

* cited by examiner

METHODS AND APPARATUSES FOR CONTROLLING THE HARVEST CYCLE OF AN ICE MAKER USING A HARVEST SENSOR AND A TEMPERATURE SENSOR

FIELD OF THE INVENTION

This invention relates generally to automatic ice making machines and, more particularly, to grid style batch type ice making machines comprising control systems that terminate the harvest cycle using a harvest sensor with the addition of temperature monitoring to improve harvest reliability.

BACKGROUND OF THE INVENTION

Ice making machines, or ice makers, typically comprise a refrigeration and water system that employs a source of refrigerant flowing serially through a compressor, a condenser, a thermal expansion device, an evaporator, and a freeze plate comprising a lattice-type cube mold thermally coupled with the evaporator. Additionally, typical ice makers employ gravity water flow and ice harvest systems that are well known and in extensive use. Ice makers having such a refrigeration and water systems are often disposed on top of ice storage bins, where ice that has been harvested is stored until it is needed. Such ice makers may also be of the "self-contained" type wherein the ice maker and ice storage bin are a single unit. Such ice makers have received wide acceptance and are particularly desirable for commercial installations such as restaurants, bars, motels and various beverage retailers having a high and continuous demand for fresh ice.

In these ice makers, water is supplied at the top of a freeze plate which directs the water in a tortuous path toward a water pump. A portion of the supplied water collects on the freeze plate, freezes into ice and is identified as sufficiently frozen by suitable means whereupon the freeze plate is defrosted such that the ice is slightly melted and discharged or harvested therefrom into an ice storage bin. Typically, these ice machines can be classified according to the type of ice they make. One such type is a grid style ice maker which makes generally square ice cubes that form within individual grids of the freeze plate which then form into a continuous sheet of ice cubes as the thickness of the ice increases beyond that of the freeze plate. After harvesting, the sheet of ice cubes will break into individual cubes as they fall into the ice storage bin. Another type of ice maker is an individual ice cube maker which makes generally square ice cubes that form within individual grids of the freeze plate which do not form into a continuous sheet of ice cubes. Therefore, upon harvest individual ice cubes fall from the freeze plate and into the ice storage bin. Control means are provided to control the operation of the ice maker to ensure a constant supply of ice. Various embodiments of the invention can be adapted to either type of ice maker, and to others not identified, without departing from the scope of the invention.

SUMMARY OF THE INVENTION

One aspect of the present invention is directed to an ice maker for forming ice having a refrigeration system, a water system, and a controller. The refrigeration system uses a refrigerant capable of transitioning between liquid and gaseous states, and includes: (a) a compressor for pressurizing the refrigerant; (b) a condenser for receiving the pressurized refrigerant and condensing the refrigerant into a substantially liquid refrigerant, wherein the condenser is in fluid communication with the compressor via a discharge line; (c) a thermal expansion device for converting the high pressure liquid refrigerant leaving the condenser into low pressure liquid refrigerant, wherein the thermal expansion valve is in fluid communication with the condenser via a liquid line; (d) an evaporator for receiving the low pressure liquid refrigerant from the thermal expansion valve and discharging low pressure, substantially gaseous refrigerant via a suction line connected to the compressor; (e) a freeze plate thermally coupled to the evaporator; and (f) a hot gas valve which is adapted to be opened during a harvest cycle to direct warm refrigerant from the compressor to the evaporator through a hot gas bypass line. The water system includes a water pump which, during a cooling cycle, pumps water over the freeze plate wherein the water collects in the freeze plate and freezes into ice. The ice maker further includes a harvest sensor for detecting when at least a portion of the ice is harvested from the freeze plate and a temperature sensor for measuring a temperature that indicates that all of the ice has been harvested from the freeze plate. The controller is adapted to control the hot gas valve in response to an indication from the harvest sensor that at least a portion of the ice has harvested from the freeze plate and the temperature measured by the temperature sensor indicating that all of the ice has been harvested from the freeze plate.

Another aspect of the present invention is directed to an ice maker for forming ice having a refrigeration system, a water system, and a controller. The ice maker includes a refrigeration system having a compressor, a condenser, an evaporator, a freeze plate thermally coupled to the evaporator, and a hot gas valve. The compressor, condenser, and evaporator are in fluid communication by one or more refrigerant lines and a refrigerant cycles through the refrigerant lines. The water system is adapted to supply water to the freeze plate wherein the water collects in the freeze plate and freezes into ice. The ice maker also includes a harvest sensor for detecting when at least a portion of the ice is harvested from the freeze plate and a temperature sensor for measuring a temperature that indicates that all of the ice has been harvested from the freeze plate. The controller is adapted to control the hot gas valve in response to an indication from the harvest sensor that at least a portion of the ice has harvested from the freeze plate and the temperature measured by the temperature sensor indicating that all of the ice has been harvested from the freeze plate.

Yet another aspect of the invention is directed to an ice maker for forming ice having a refrigeration system, a water system, and a controller. The ice maker includes a refrigeration system having a compressor, a condenser, an evaporator, a freeze plate thermally coupled to the evaporator, and a hot gas valve. The compressor, condenser, and evaporator are in fluid communication by one or more refrigerant lines and a refrigerant cycles through the refrigerant lines. The water system is adapted to supply water to the freeze plate wherein the water collects in the freeze plate and freezes into ice. The ice maker also includes a harvest sensor for detecting when at least a portion of the ice is harvested from the freeze plate and a temperature sensor for measuring a temperature that indicates that all of the ice has been harvested from the freeze plate. The controller is adapted to close the hot gas valve when all of the ice has been harvested from the freeze plate based on inputs from the harvest sensor and the temperature sensor.

In various aspects of the invention, one or more temperature sensors may be used to measure the temperature of the refrigerant exiting the evaporator, the temperature of the refrigerant entering the evaporator, and/or the temperature of the freeze plate.

Yet another aspect of the invention is directed to an ice maker for forming ice having a refrigeration system, a water system, and a controller. The ice maker includes a refrigeration system having a compressor, a condenser, an evaporator, a freeze plate thermally coupled to the evaporator, and a hot gas valve. The compressor, condenser, and evaporator are in fluid communication by one or more refrigerant lines and a refrigerant cycles through the refrigerant lines. The water system is adapted to supply water to the freeze plate wherein the water collects in the freeze plate and freezes into ice. The ice maker also includes a harvest sensor for detecting when at least a portion of the ice is harvested from the freeze plate and a temperature sensor for measuring a temperature of the refrigerant exiting the evaporator. The controller is adapted to close the hot gas valve in response to an indication from the harvest sensor that at least a portion of the ice has harvested from the freeze plate and the temperature measured by the temperature sensor is greater than or equal to a set temperature.

Yet another aspect of the invention is directed to an ice maker for forming ice having a refrigeration system, a water system, and a controller. The ice maker includes a refrigeration system having a compressor, a condenser, an evaporator, a freeze plate thermally coupled to the evaporator, and a hot gas valve. The compressor, condenser, and evaporator are in fluid communication by one or more refrigerant lines and a refrigerant cycles through the refrigerant lines. The water system is adapted to supply water to the freeze plate wherein the water collects in the freeze plate and freezes into ice. The ice maker also includes a harvest sensor for detecting when at least a portion of the ice is harvested from the freeze plate. Furthermore, the ice maker includes a first temperature sensor for measuring a temperature of the refrigerant exiting the evaporator and a second temperature sensor for measuring a temperature of the refrigerant entering the evaporator. The controller is adapted to close the hot gas valve in response to an indication from the harvest sensor that at least a portion of the ice has harvested from the freeze plate and the temperature measured by the first temperature sensor is substantially equal to the temperature measured by the second temperature sensor.

Yet another aspect of the invention is directed to an ice maker for forming ice having a refrigeration system, a water system, and a controller. The ice maker includes a refrigeration system having a compressor, a condenser, an evaporator, a freeze plate thermally coupled to the evaporator, and a hot gas valve. The compressor, condenser, and evaporator are in fluid communication by one or more refrigerant lines and a refrigerant cycles through the refrigerant lines. The water system is adapted to supply water to the freeze plate wherein the water collects in the freeze plate and freezes into ice. The ice maker also includes a harvest sensor for detecting when at least a portion of the ice is harvested from the freeze plate a temperature sensor for measuring a temperature of the freeze plate. The controller is adapted to close the hot gas valve in response to an indication from the harvest sensor that at least a portion of the ice has harvested from the freeze plate and the temperature measured by the temperature sensor is greater than or equal to a set temperature.

In various aspects of the invention, the harvest sensor may be a mechanical or mechanical/electrical relay, an electronic relay, an optical sensor, an audible sensor, a vibration sensor, an accelerometer, a rotational sensor, a proximity sensor, a through-beam sensor system, a retroreflective sensor system, a proximity-sensing sensor system, a diffuse photoelectric sensor system, and/or any other type of sensor for determining when ice has been harvested from a freeze plate known in the art.

In various aspects of the invention, the temperature sensor may be a thermocouple, a thermistor, a resistance temperature detector ("RTD"), a pyrometer, an infrared thermometer, and/or any other type of temperature sensing device known in the art.

By monitoring both a harvest sensor and a temperature sensor, the reliability of the ice maker may be increased and the additional feedback provided by the temperature sensor to the controller may reduce or minimize any detrimental effects on the ice maker from potential harvest sensor failure.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

Like reference numerals indicate corresponding parts throughout the several views of the various drawings.

DETAILED DESCRIPTION

Figure 1:
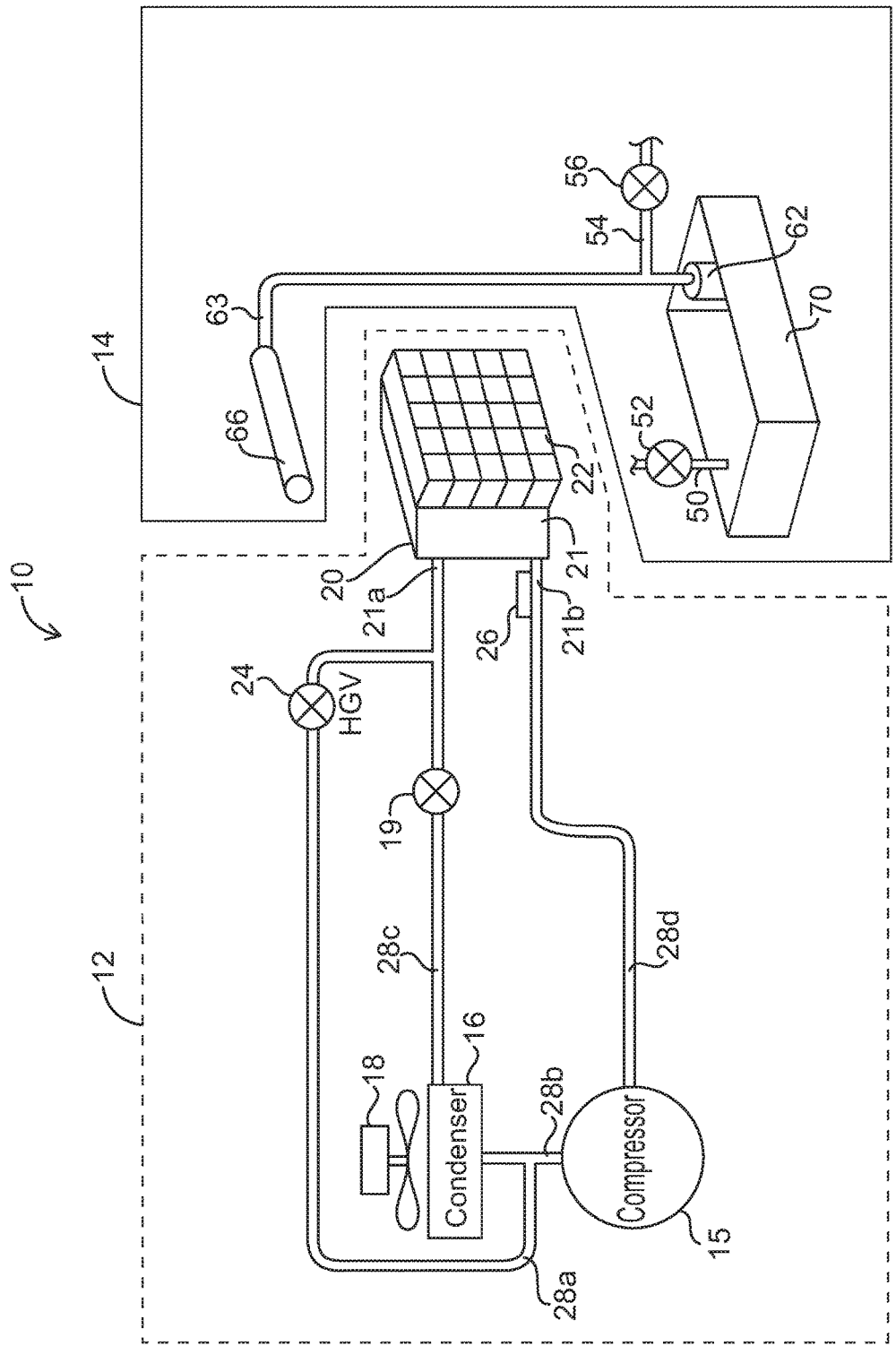
FIG. 1 is a schematic drawing of an ice maker having various components according to a first embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about." It should also be noted that any references herein to front and back, right and left, top and bottom and upper and lower are intended for convenience of description, not to limit an invention disclosed herein or its components to any one positional or spatial orientation.

Traditionally, the principal components of a refrigeration system for use in an ice maker include a source of refrigerant flowing serially through a compressor, a condenser, a thermal expansion valve, and an evaporator. A freeze plate is thermally coupled to the evaporator in order to freeze the supplied water into ice.

As the volume of ice increases on the freeze plate, simultaneously the volume of water also decreases in the supply tank or sump. A typical ice maker control system will monitor either the amount of ice, the decrease in water level, or some other refrigeration system parameter to determine the desirable batch weight. At that point, the control will begin the harvesting portion of the cycle, where the condenser is bypassed and hot gas is sent directly to the evaporator to melt the previously frozen batch of ice. The evaporator warms slowly and detaches the ice from the freeze plate.

In typical grid style ice makers, a harvest switch or sensor is used for terminating the harvest cycle. The harvest sensor is attached to a flap placed in the path of the sliding ice. As the ice slides away from the freeze plate, the harvest sensor is triggered, and a signal is sent to the controller to terminate the harvest. The hot gas valve bypass valve closes, and the condenser begins to cool the evaporator for the next batch of ice.

However, this harvest termination method has a fallacy in that the control system actually has no way of actually determining: (1) whether any ice actually exists on the evaporator at the time of harvest due to a failed freeze attempt during the startup cycle, or during a normal ice making cycle; (2) whether all of the ice from the previous ice making cycle has melted from the evaporator in the event the harvest sensor is not triggered (in this case, after a considerable amount of time, a backup timer may be used to terminate the harvest cycle, but only after adding considerable wear to the system from overheating); or (3) whether a partial portion of the ice batch remains on the evaporator after the harvest sensor is triggered, which would lead to an oversized batch weight for the subsequent cycle, leading to a common fault in the industry called "freeze-up." The frequency of this failure mode is well known throughout the ice maker industry, especially during winter months and in areas where the water hardness is particularly high. Further, permanent damage to the evaporator could potentially leave the entire ice maker inoperable and also risk property damage due to flooding.

Therefore, there is a need for an enhanced grid style ice maker wherein the reliability of the harvest can be improved through the use of additional feedback to the control system, preventing unwanted freeze ups, potential flooding, and excessive wear on the system components from extended harvest cycles. Thus as described herein, an ice maker includes at least two sensors for determining when all of the ice in a freeze plate is harvested.

Figure 4:
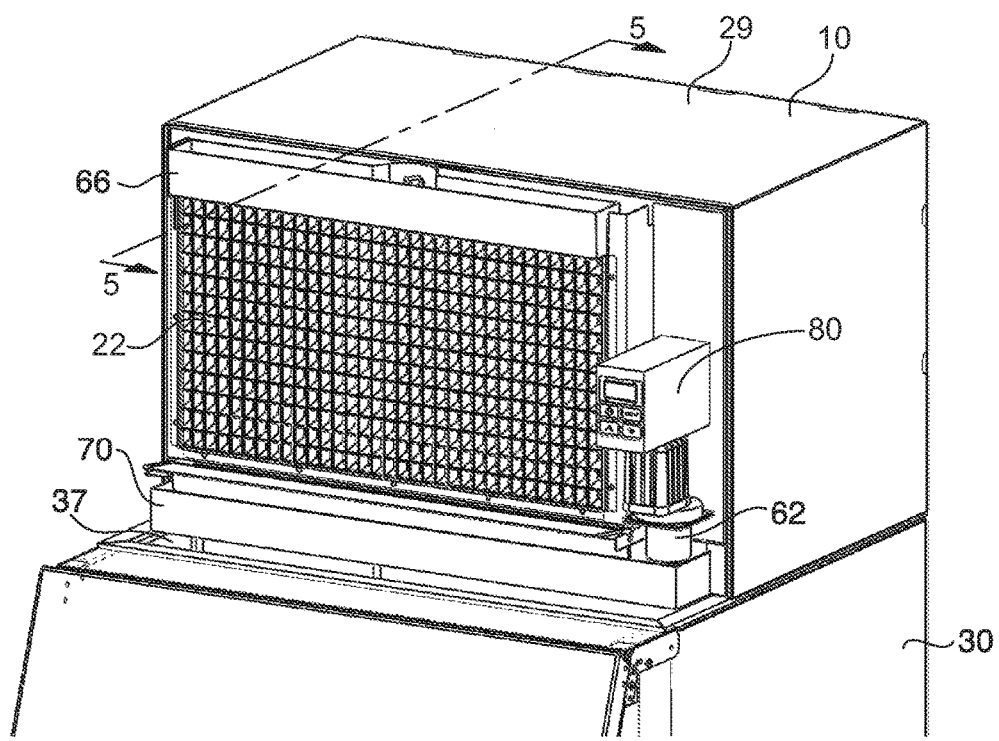
FIG. 4 is a right perspective view of an ice maker disposed within a cabinet wherein the cabinet is disposed on an ice storage bin assembly according to the first embodiment of the invention.

FIG. 1 illustrates certain principal components of one embodiment of ice maker 10 having a refrigeration system 12 and water system 14. The refrigeration system 12 of ice maker 10 includes compressor 15, condenser 16 for condensing compressed refrigerant vapor discharged from the compressor 15, thermal expansion device 19 for lowering the temperature and pressure of the refrigerant, ice formation device 20, and hot gas valve 24. Thermal expansion device 19 may include, but is not limited to, a capillary tube, a thermostatic expansion valve or an electronic expansion valve. Ice formation device 20 includes evaporator 21 and freeze plate 22 thermally coupled to evaporator 21. Evaporator 21 is constructed of serpentine tubing (not shown) as is known in the art. Freeze plate 22 contains a large number of pockets (usually in the form of a grid of cells) on its surface where water flowing over the surface can collect (see FIG. 4). Hot gas valve 24 is used to direct warm refrigerant from compressor 15 directly to evaporator 21 at inlet 21a to remove or harvest ice cubes from freeze plate 22 when the ice has reached the desired thickness.

Ice maker 10 also includes a temperature sensor 26 placed at the outlet 21b of the evaporator 21 to control thermal expansion device 19 and to monitor the harvest cycle of ice maker 10 as described more fully elsewhere herein. In other embodiments, where thermal expansion device 19 is an electronic expansion valve, ice maker 10 may also include a pressure sensor (not shown) placed at the outlet of the evaporator 21 to control thermal expansion device 19 as is known in the art. In certain embodiments that utilize a gaseous cooling medium (e.g., air) to provide condenser cooling, a condenser fan 18 may be positioned to blow the gaseous cooling medium across condenser 16. As described more fully elsewhere herein, a form of refrigerant cycles through these components via refrigerant lines 28a, 28b, 28c, 28d.

The water system 14 of ice maker 10 includes water pump 62, water line 63, water distributor 66 (e.g., manifold, pan, tube, etc.), and sump 70 located below freeze plate 22 adapted to hold water. During operation of ice maker 10, as water is pumped from sump 70 by water pump 62 through water line 63 and out of water distributor 66, the water impinges on freeze plate 22, flows over the pockets of freeze plate 22 and freezes into ice. Sump 70 may be positioned below freeze plate 22 to catch the water coming off of freeze plate 22 such that the water may be recirculated by water pump 62.

Water system 14 of ice maker 10 further includes water supply line 50 and water inlet valve 52 disposed thereon for filling sump 70 with water from a water source (not shown), wherein some or all of the supplied water may be frozen into ice. Water system 14 of ice maker 10 further includes discharge line 54 and discharge valve 56 (e.g., purge valve, drain valve) disposed thereon. Water and/or any contaminants remaining in sump 70 after ice has been formed may be discharged via discharge line 54 and discharge valve 56.

In various embodiments, discharge line 54 may be in fluid communication with water line 63. Accordingly, water in sump 70 may be discharged from sump 70 by opening discharge valve 56 when water pump 62 is running.

Figure 2:
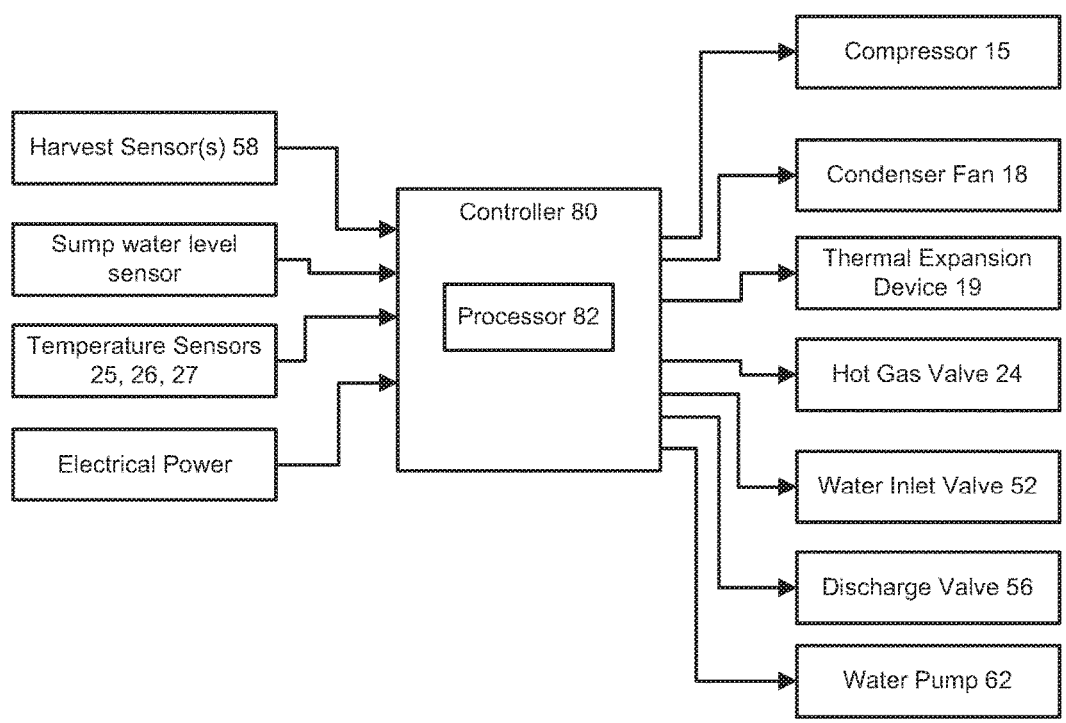
FIG. 2 is a schematic drawing of a controller for controlling the operation of the various components of an ice maker according to the first embodiment of the invention.

Referring now to FIG. 2, ice maker 10 may also include a controller 80. Controller 80 may be located remote from ice formation device 20 and sump 70. Controller 80 may include a processor 82 for controlling the operation of ice maker 10. Processor 82 of controller 80 may include a processor-readable medium storing code representing instructions to cause processor 82 to perform a process. Processor 82 may be, for example, a commercially available microprocessor, an application-specific integrated circuit (ASIC) or a combination of ASICs, which are designed to achieve one or more specific functions, or enable one or more specific devices or applications. In yet another embodiment, controller 80 may be an analog or digital circuit, or a combination of multiple circuits. Controller 80 may also include one or more memory components (not shown) for storing data in a form retrievable by controller 80. Controller 80 can store data in or retrieve data from the one or more memory components.

In various embodiments, controller 80 may also comprise input/output (I/O) components (not shown) to communicate with and/or control the various components of ice maker 10. In certain embodiments, for example controller 80 may receive inputs from a harvest sensor 58 (see FIG. 5) and temperature sensors 25 (see FIG. 10), 26 (see FIG. 1), 27 (see FIG. 8) for determining when ice has been harvested, a sump water level sensor (not shown), an electrical power source (not shown), and/or a variety of sensors and/or switches including, but not limited to, pressure transducers, acoustic sensors, etc. In various embodiments, based on those inputs for example, controller 80 may be able to control compressor 15, condenser fan 18, thermal expansion device 19, hot gas valve 24, water inlet valve 52, discharge valve 56, and/or water pump 62.

Figure 3:
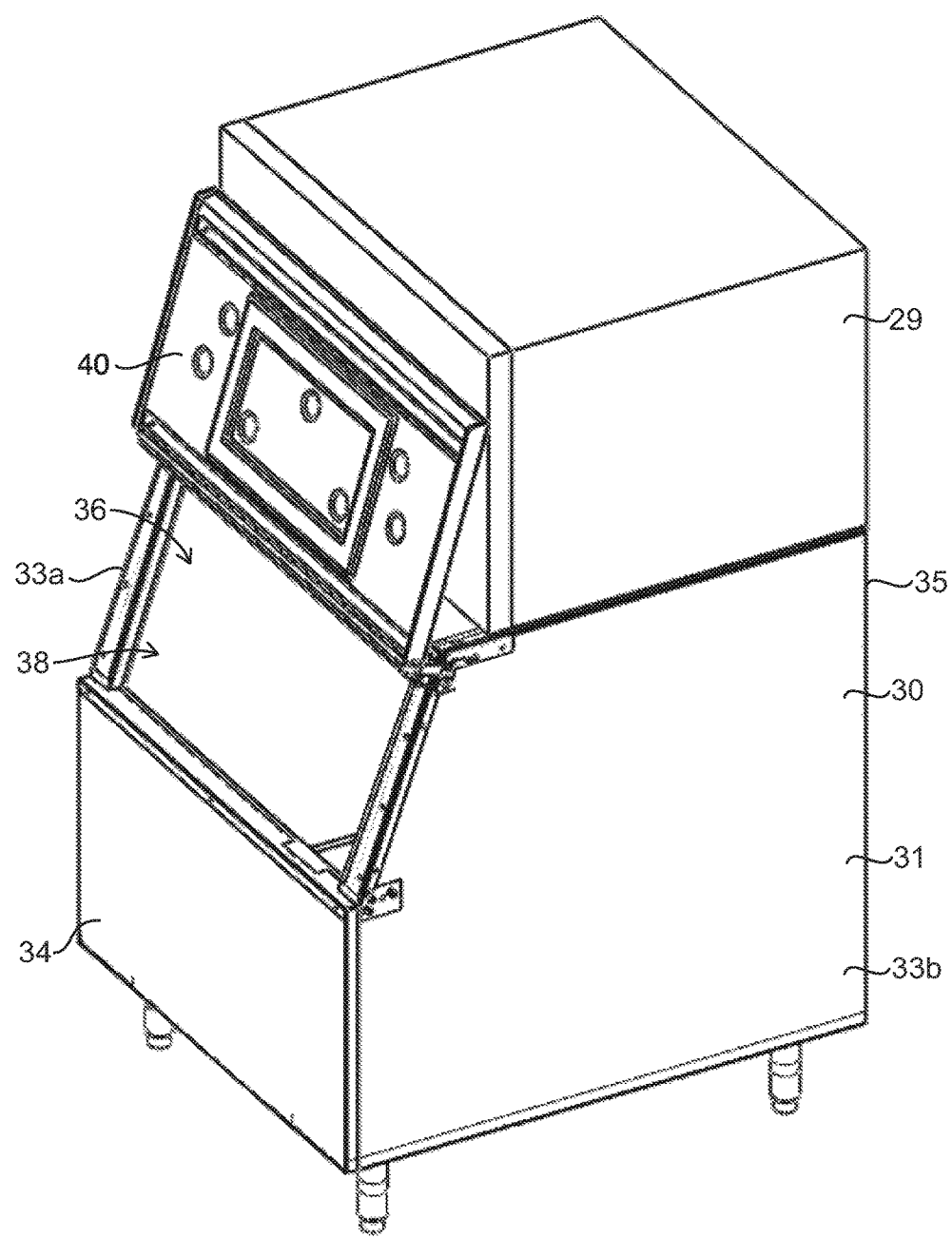
FIG. 3 is a right perspective view of an ice maker disposed within a cabinet wherein the cabinet is disposed on an ice storage bin assembly according to the first embodiment of the invention.

In many embodiments, as illustrated in FIG. 3, ice maker 10 may be disposed inside of a cabinet 29 which may be mounted on top of an ice storage bin assembly 30. Cabinet 29 may be closed by suitable fixed and removable panels to provide temperature integrity and compartmental access, as will be understood by those in the art. Ice storage bin assembly 30 includes an ice storage bin 31 having an ice hole 37 (see FIG. 4) through which ice produced by ice maker 10 falls. The ice is then stored in cavity 36 until retrieved. Ice storage bin 31 further includes an opening 38 which provides access to the cavity 36 and the ice stored therein. Cavity 36, ice hole 37 (see FIG. 4) and opening 38 are formed by a left wall 33a, a right wall 33b, a front wall 34, a back wall 35 and a bottom wall (not shown). The walls of ice storage bin 31 may be thermally insulated with various insulating materials including, but not limited to, fiberglass insulation or open- or closed-cell foam comprised, for example, of polystyrene or polyurethane, etc. in order to retard the melting of the ice stored in ice storage bin 31. A door 40 can be opened to provide access to cavity 36.

Ice maker 10 may have other conventional components not described herein without departing from the scope of the invention.

Having described each of the individual components of one embodiment of ice maker 10, the manner in which the components interact and operate in various embodiments may now be described in reference again to FIG. 1. During operation of ice maker 10 in an ice making cycle, compressor 15 receives low-pressure, substantially gaseous refrigerant from evaporator 21 through suction line 28d, pressurizes the refrigerant, and discharges high-pressure, substantially gaseous refrigerant through discharge line 28b to condenser 16. In condenser 16, heat is removed from the refrigerant, causing the substantially gaseous refrigerant to condense into a substantially liquid refrigerant. The substantially liquid refrigerant may include some gas such that the refrigerant is a liquid-gas mixture.

After exiting condenser 16, the high-pressure, substantially liquid refrigerant is routed through liquid line 28c to thermal expansion device 19, which reduces the pressure of the substantially liquid refrigerant for introduction into evaporator 21 at inlet 21a. As the low-pressure expanded refrigerant is passed through tubing of evaporator 21, the refrigerant absorbs heat from the tubes contained within evaporator 21 and vaporizes as the refrigerant passes through the tubes. Low-pressure, substantially gaseous refrigerant is discharged from outlet 21b of evaporator 21 through suction line 28d, and is reintroduced into the inlet of compressor 15.

In certain embodiments of the invention, at the start of the ice making cycle, a water fill valve 52 is turned on to supply a mass of water to sump 70 and water pump 62 is turned on. The ice maker will freeze some or all of the mass of water into ice. After the desired mass of water is supplied to sump 70, the water fill valve may be closed. Compressor 15 is turned on to begin the flow of refrigerant through refrigeration system 12. Water pump 62 circulates the water over freeze plate 22 via water line 63 and water distributor 66. The water that is supplied by water pump 62 then begins to cool as it contacts freeze plate 22, returns to water sump 70 below freeze plate 22 and is recirculated by water pump 62 to freeze plate 22. Once the water is sufficiently cold, water flowing across freeze plate 22 starts forming ice cubes.

After the ice cubes are formed such that the desired ice cube thickness is reached, water pump 62 is turned off and the harvest portion of the ice making cycle is initiated by opening hot gas valve 24. This allows warm, high-pressure gas from compressor 15 to flow through hot gas bypass line 28a to enter evaporator 21 at inlet 21a. The warm refrigerant flows through the serpentine tubing of evaporator 21 and a heat transfer occurs between the warm refrigerant and the evaporator 21. This heat transfer warms evaporator 21, freeze plate 22, and the ice formed in freeze plate 22. This results in melting of the formed ice to a degree such that the ice may be released from freeze plate 22 and falls into ice storage bin 31 where the ice can be temporarily stored and later retrieved.

This heat transfer also results in a decreased temperature of the refrigerant exiting evaporator 21 at outlet 21b via suction line 28d as compared to the temperature of the refrigerant entering evaporator 21 at inlet 21a via hot gas bypass line 28a. Accordingly, while ice remains in freeze plate 22, the temperature of the refrigerant exiting evaporator 21 via suction line 28d will be much lower than the temperature of the refrigerant entering evaporator 21 via hot gas bypass line 28a. When no ice remains on freeze plate 22, the heat transfer between the warm refrigerant and evaporator 21 is reduced as compared to when ice remains on freeze plate 22. This reduced heat transfer results in the temperature of the refrigerant exiting evaporator 21 at outlet 21b being much closer to the temperature of the refrigerant entering evaporator 21 at inlet 21a.

Figure 5:
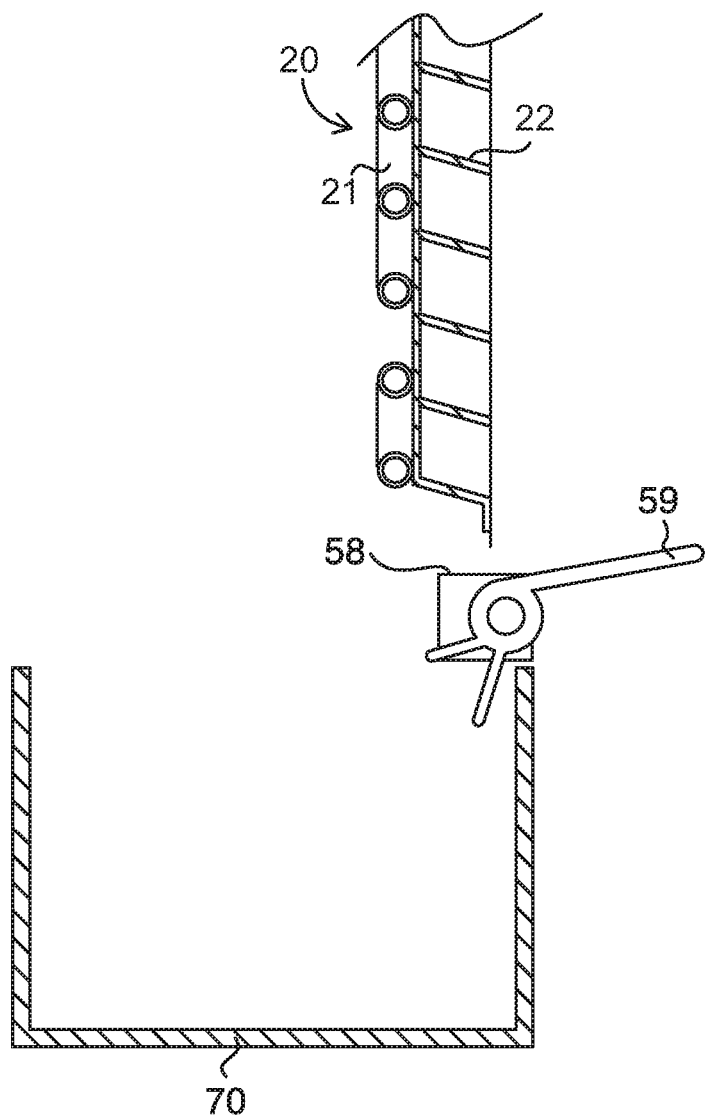
FIG. 5 is a left section view of an evaporator, freeze plate, sump, harvest sensor and flap assembly according to the first embodiment of the invention.

Referring now to FIG. 5, ice maker 10 includes harvest sensor 58 for monitoring the harvest cycle. Harvest sensor 58 is attached to door or flap 59 placed in the path of the sliding ice. As the ice slides away from freeze plate 22, the harvested ice strikes flap 59 rotating it downward. This triggers harvest sensor 58 and a signal is sent to controller 80 indicating that harvest sensor 58 has been triggered. Accordingly, in certain embodiments, for example, as illustrated in FIG. 5, harvest sensor 58 may sense when flap 59 is open or closed by sensing rotation of flap 59. In other embodiments, for example, harvest sensor 58 may sense when flap 59 is open or closed by whether door 59 contacts or is in proximity to harvest sensor 58. It will be understood that any type of harvest sensor which can sense whether flap 59 is open or closed may be used without departing from the scope of the invention. The use of a harvest sensor of the type shown in FIG. 5 is typical in ice makers.

Figure 6:
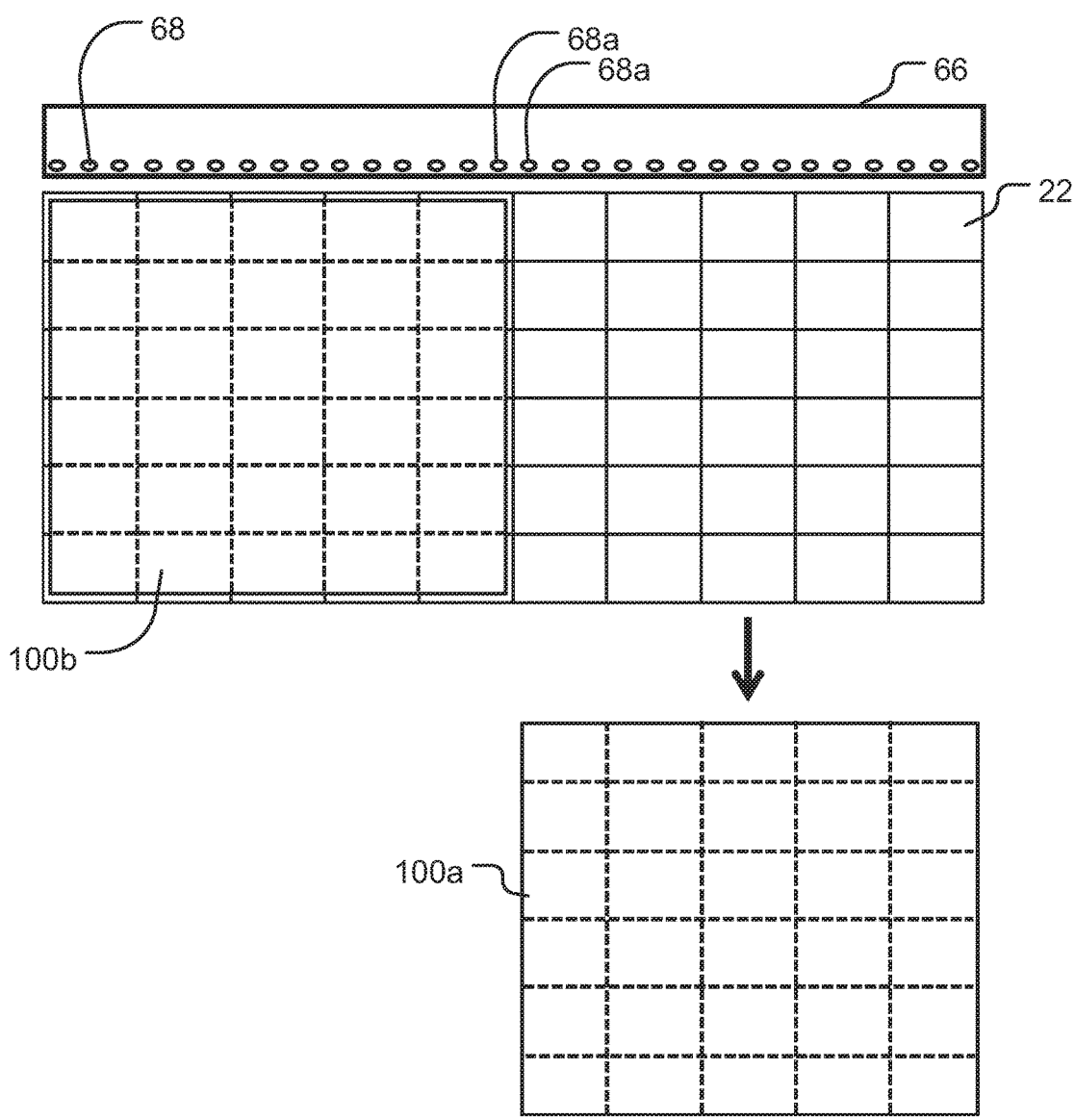
FIG. 6 is a front view of a partial ice slab falling from a freeze plate according to an embodiment of the invention.

However, as described above relying on the harvest sensor alone for monitoring harvest is not an optimal way of operating ice maker 10. Under certain conditions for example, the controllers of typical ice makers with a harvest sensor alone may not be able to reliably and accurately determine whether all of the ice formed in the freeze plate is harvested. For example, as shown in FIG. 6, a half slab 100$a$ of ice may fall from freeze plate 22 while the other half slab 100$b$ may remain on freeze plate 22. These half slabs 100$a$, 100$b$ could result from a variety of reasons, including but not limited to, the ice slab breaking during harvest, one or more holes 68$a$ of the population of holes 68 of water distributor 66 being clogged such that two separate slabs are formed, etc. When ice slab 100$a$ falls, ice slab 100$a$ would strike the flap below freeze plate 22 triggering the harvest sensor and ice maker would close hot gas valve and return to making ice. Thus, additional ice would be formed on top of slab 100$b$ during a subsequent ice making cycle leading to ice that is too thick on at least a portion of freeze plate 22. This extra thick ice would then result in an extra-long harvest cycle and could potentially damage the ice maker. While only two slabs 100$a$, 100$b$ of equal size are shown, it will be understood that in other situations multiple slabs of varying size may fall from and remain on freeze plate 22.

In order to avoid the above described issues, ice maker 10 uses a temperature sensor in addition to harvest sensor 58 to confirm that all of the ice has been harvested from freeze plate 22. With reference again to FIG. 1, in one embodiment, temperature sensor 26 is used to measure the temperature of the refrigerant exiting evaporator 21 at outlet 21$b$ to determine if all of the ice has been harvested from freeze pate 60. By measuring the temperature of the refrigerant exiting evaporator 21 at outlet 21$b$, controller 80 can monitor the rise in temperature of the refrigerant exiting evaporator 21 at outlet 21$b$ and can confirm that all of the ice has been harvested from freeze plate 22.

Temperature sensor 26 is preferably a thermocouple located on or proximate outlet 21$b$ of evaporator 21 which can measure the temperature of the refrigerant exiting evaporator 21. Alternatively, in various embodiments, temperature sensor 26 may measure the temperature of outlet 21$b$ of evaporator or the temperature of suction line 28$d$ proximate outlet 21$b$ of evaporator 21 instead of measuring the refrigerant temperature directly. It will be understood that temperature sensor 26 may include any type of temperature measuring device known in the art, including but not limited to, a thermocouple, a thermistor, a resistance temperature detector ("RTD"), a pyrometer, an infrared thermometer, etc. without departing from the scope of the disclosure.

Figure 7:
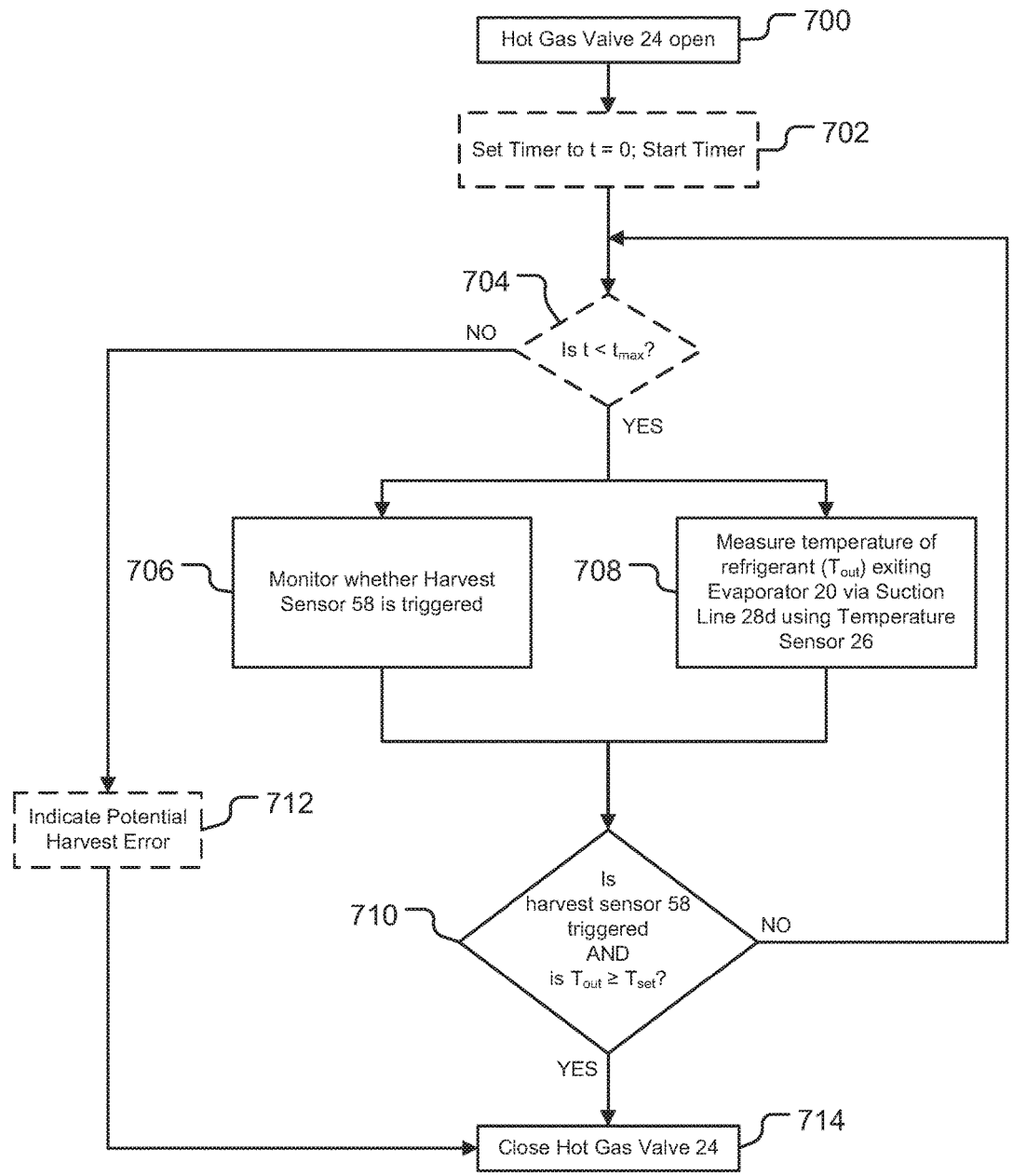
FIG. 7 is flow chart describing the harvest cycle operation of an ice maker according to the first embodiment of the invention.

With reference now to FIG. 7, a method of determining when harvest is complete according to an embodiment of the disclosure is described in detail. As described above, after the ice cubes are formed such that the desired ice cube thickness is reached, water pump 62 is turned off and the harvest portion of the ice making cycle is initiated by opening hot gas valve 24 at step 700. Optionally, at step 702 a timer is set to zero (0) and started. The timer is preferably implemented in controller 80 and may be used to time the harvest portion of the ice making cycle. The timer may be used as a fail-safe and can close hot gas valve 24 and/or shut off ice maker 10 in the event that the maximum harvest time ($t_{max}$) is reached as described in greater detail below. At optional step 704, controller 80 checks to see whether the elapsed harvest time (t) is less than the maximum harvest time ($t_{max}$).

While the elapsed harvest time (t) is less than the maximum harvest time ($t_{max}$), controller 80 monitors whether harvest sensor 58 is triggered at step 706. When the ice formed in freeze plate 22 melts to a degree such that at least a portion of the ice is released or harvested from freeze plate 22, the ice contacts door or flap 59 and triggers harvest sensor 58. Controller 80 thus receives as an input that harvest sensor 58 has been triggered. This indicates that at least a portion of the ice has been harvested.

At step 708, controller 80 measures the temperature of the refrigerant ($T_{out}$) exiting evaporator 21 via suction line 28$d$ using temperature sensor 26. Once the ice completely falls from freeze plate 22, the temperature of the refrigerant exiting evaporator 21 at outlet 21$b$ will be higher than the temperature of the refrigerant exiting evaporator 21 at outlet 21$b$ when ice still remains on freeze plate 22. Therefore, even if some of the ice falls from freeze plate 22 and triggers harvest switch 58, but the temperature of the refrigerant exiting evaporator 21 at outlet 21$b$ is lower than the temperature of the refrigerant entering evaporator 21 at inlet 21$a$, then ice still remains in freeze plate 22 and harvest is not yet complete.

At step 710, controller 80 checks to see whether both harvest sensor 58 has been triggered and whether the temperature of the refrigerant ($T_{out}$) exiting evaporator 21 via suction line 28$d$ is greater than or equal to a set temperature ($T_{set}$). The set temperature ($T_{set}$) may be stored in controller 80 and is the temperature of the refrigerant exiting evaporator 21 at outlet 21$b$ that should be measured by temperature sensor 26 when all of the ice has been harvested from freeze plate 22. The set temperature ($T_{set}$) may be from about 40 degrees F. to about 60 degrees F. (e.g., about 40 degrees F., about 45 degrees F., about 50 degrees F., about 55 degrees F., about 60 degrees F.).

After harvest sensor 58 has been triggered and $T_{out}$ is greater than or equal to the set temperature $T_{set}$, controller 80 determines that all of the ice has been harvested from freeze plate 22. Therefore, at step 714, controller 80 closes hot gas valve 24 thereby terminating the harvest portion of the ice making cycle. The making of a subsequent batch of ice can then begin in a new ice making cycle. Therefore, by monitoring when harvest sensor 58 is triggered and by monitoring $T_{out}$, controller 80 can confirm that all of the ice in freeze plate 22 has been harvested.

While harvest sensor 58 is not triggered or $T_{out}$ is less than $T_{set}$ at step 710, controller 80 loops back to optional step 704 to check whether the harvest time (t) measured by timer less than the maximum harvest time ($t_{max}$). If the harvest time (t) is less than the maximum harvest time ($t_{max}$), then the method cycles again through steps 706, 708, and 710. If however, the harvest time (t) is not less than maximum harvest time ($t_{max}$) (indicating that harvest time (t) is greater than or equal to the maximum harvest time ($t_{max}$)), then controller 80 may optionally indicate a potential harvest error at step 712 and will close hot gas valve at step 714. The potential harvest error may be indicated by an audible and/or visual alarm. In other embodiments, the potential harvest error may be sent by controller 80 to a remote location such as a computer or portable electronic device (e.g., smart phone, tablet, laptop computer, etc.). By closing hot gas valve when the maximum harvest time ($t_{max}$) is met or exceeded, damage to ice maker 10 from overheating may be avoided. The maximum harvest time ($t_{max}$) may be from about 30 seconds to about 10 minutes (e.g., about 30 seconds, about 45 seconds, about 1, minute, about 2 minutes, about 3 minutes, about 4 minutes, about 5 minutes, about 6 minutes, about 7 minutes, about 8 minutes, about 9 minutes, about 10 minutes). In various embodiments, the maximum harvest time ($t_{max}$) may be less than 30 seconds. In other embodiments, the maximum harvest time ($t_{max}$) may be more than 10 minutes. Preferably, the maximum harvest time ($t_{max}$) is about 5 minutes.

The maximum harvest time ($t_{max}$) can depend on the hot gas temperature which varies based on ambient conditions and condenser 16 cleanliness, compressor 12 capacity which effects the gas flow rate, and the efficiency of evaporator 21. Evaporator efficiency may be impacted by (1) the surface contact between the serpentine tube (not shown) and freeze plate 22 and (2) the degree of scale buildup on the surfaces of freeze plate 22. In general, at 70 degrees F. ambient, the maximum harvest time ($t_{max}$) may be from about 2 minutes to about 3 minutes. At 90 degrees F. ambient, for example, in a kitchen, the maximum harvest time ($t_{max}$) may be from about 1 minute to about 2 minutes. Additionally, in the winter months, the maximum harvest time ($t_{max}$) may increase to about 4 minutes to about 10 minutes depending on the ambient temperature. Typically, the controller may wait for up to about 10 minutes for the falling ice to trigger harvest sensor 58 to signal to controller 80 that the ice has harvested. However, there may be situations in which 10 minutes is not enough time for the ice to harvest from freeze plate 22 due to some system problem. In which case, controller 80 may default to an error diagnosis mode and may wait for the evaporator outlet temperature measured by temperature sensor 26 to rise to or above the set temperature ($T_{set}$) to ensure no ice remains on freeze plate 22. Ice maker 10 may then resume ice making.

Other embodiments of ice makers 110, 210 of the disclosure are illustrated in FIGS. 8-11 and are described below. Some features one or more of ice makers 10, 110, 210 are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

Figure 8:
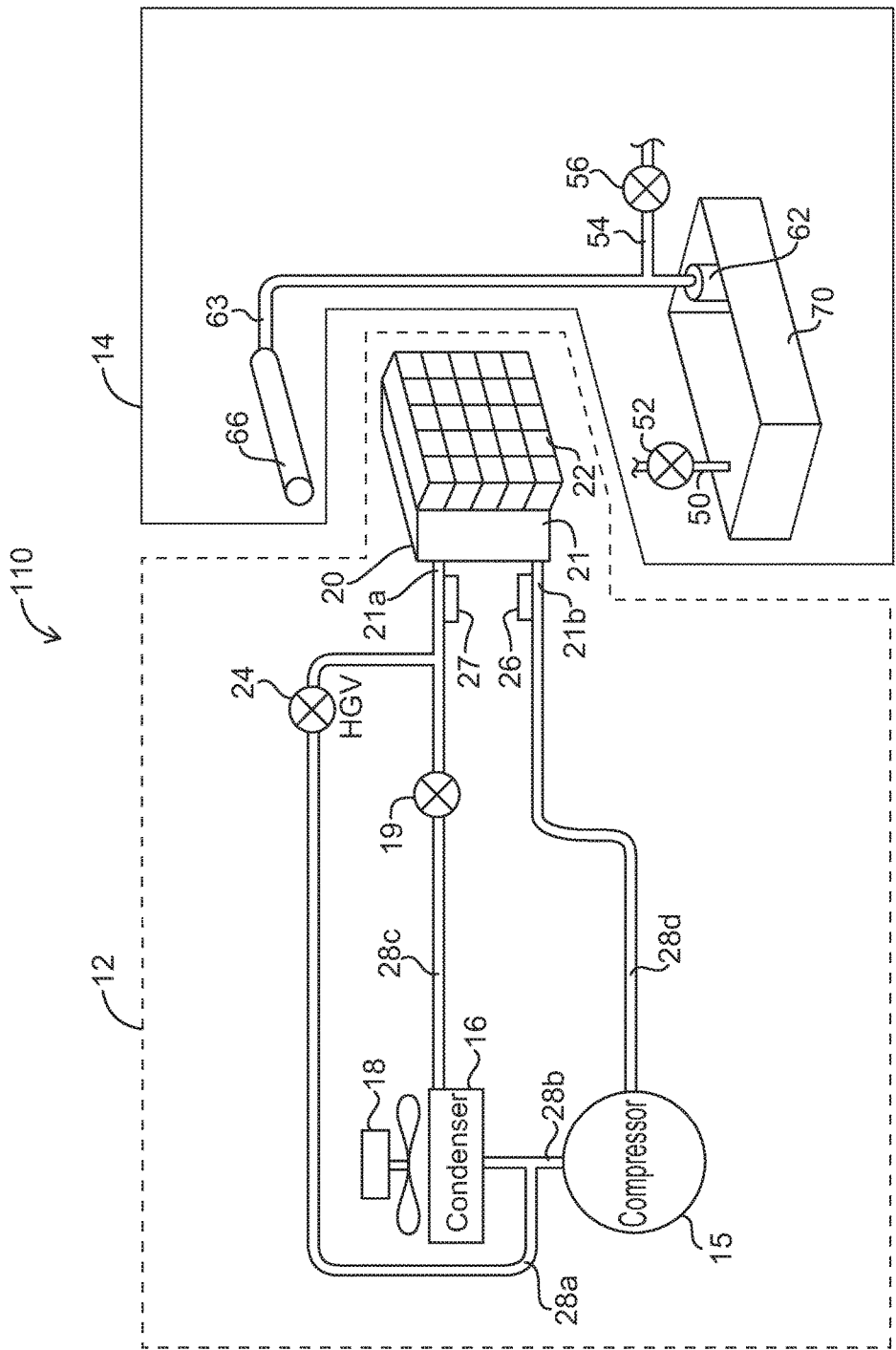
FIG. 8 is a schematic drawing of an ice maker having various components according to a second embodiment of the invention.

FIG. 8 illustrates another embodiments of an ice maker 110 that, in addition to temperature sensor 26, includes temperature sensor 27 for measuring the temperature of the refrigerant entering evaporator 21 at inlet 21a. By measuring the temperature of the refrigerant entering evaporator 21 at inlet 21a and the temperature of the refrigerant exiting evaporator 21 at outlet 21b, controller 80 can monitor the rise in temperature of the refrigerant exiting evaporator 21 at outlet 21b and can compare the outlet temperature ($T_{out}$) to the inlet temperature (T) to confirm that all of the ice has been harvested from freeze plate 22.

Like temperature sensor 26, temperature sensor 27 is preferably a thermocouple located on or proximate inlet 21a of evaporator 21 which can measure the temperature of the refrigerant entering evaporator 21. Alternatively, in various embodiments, temperature sensor 27 may measure the temperature of inlet 21a of evaporator or the temperature of hot gas bypass line 28a instead of measuring the refrigerant temperature directly. It will be understood that temperature sensor 27 may include any type of temperature measuring device known in the art, including but not limited to, a thermocouple, a thermistor, a resistance temperature detector ("RTD"), a pyrometer, an infrared thermometer, etc. without departing from the scope of the disclosure.

Figure 9:
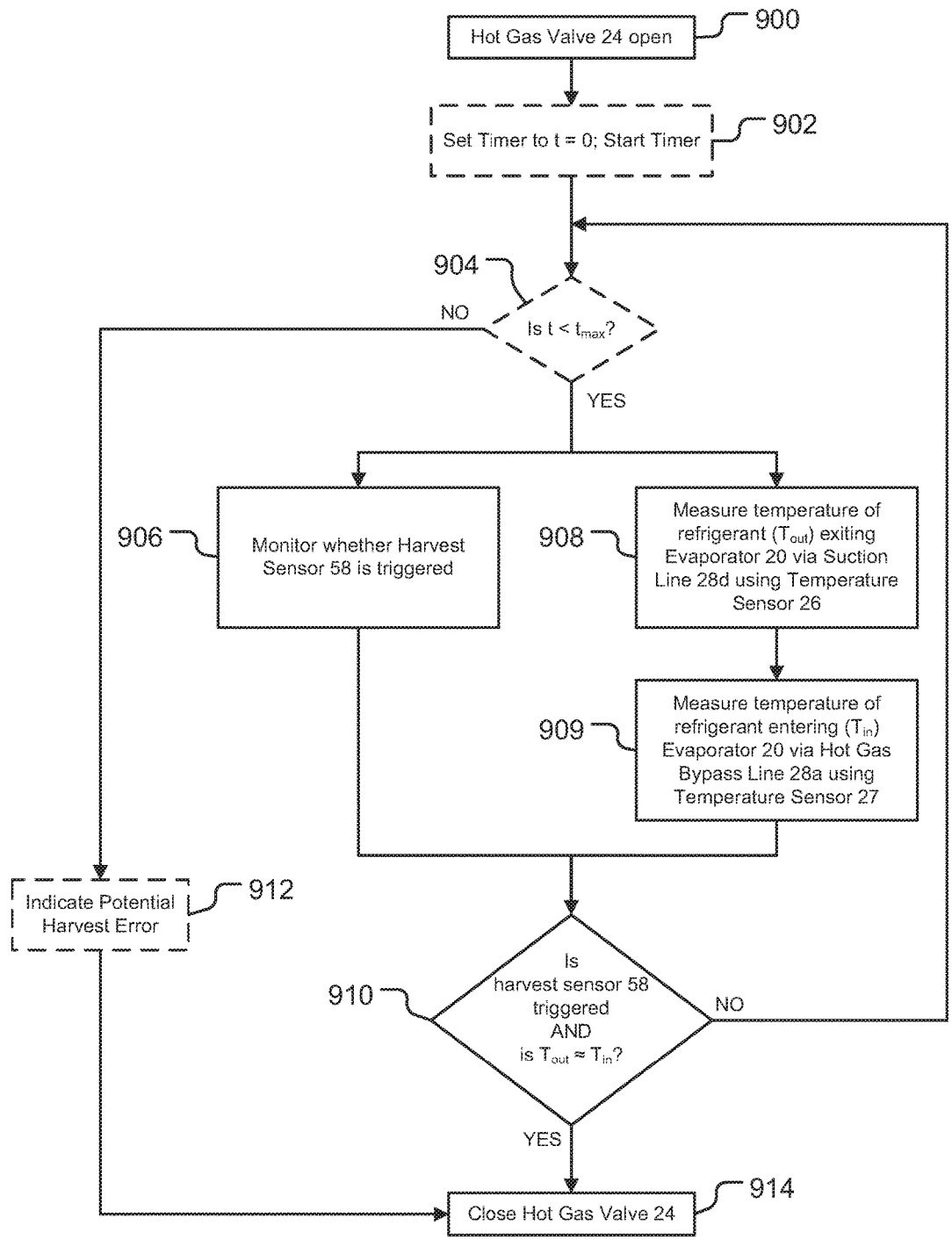
FIG. 9 is flow chart describing the harvest cycle operation of an ice maker according to the second embodiment of the invention.

With reference now to FIG. 9, a method of determining when harvest is complete with respect to ice maker 110 is described in detail. As described above, after the ice cubes are formed such that the desired ice cube thickness is reached, water pump 62 is turned off and the harvest portion of the ice making cycle is initiated by opening hot gas valve 24 at step 900. Optionally, at step 902 a timer is set to zero (0) and started. The timer is preferably implemented in controller 80 and may be used to time the harvest portion of the ice making cycle. The timer may be used as a fail-safe and can close hot gas valve 24 and/or shut off ice maker 110 in the event that the maximum harvest time ($t_{max}$) is reached as described in greater detail below. At optional step 904, controller 80 checks to see whether the elapsed harvest time (t) is less than the maximum harvest time ($t_{max}$).

While the elapsed harvest time (t) is less than the maximum harvest time ($t_{max}$), controller 80 monitors whether harvest sensor 58 is triggered at step 906. When the ice formed in freeze plate 22 melts to a degree such that at least a portion of the ice is released or harvested from freeze plate 22, the ice contacts door or flap 59 and triggers harvest sensor 58. Controller 80 thus receives as an input that harvest sensor 58 has been triggered. This indicates that at least a portion of the ice has been harvested.

At step 908, controller 80 measures the temperature of the refrigerant ($T_{out}$) exiting evaporator 21 at outlet 21b via suction line 28d using temperature sensor 26. At step 909, controller 80 measures the temperature of the refrigerant ($T_{in}$) entering evaporator 21 at inlet 21a via hot gas bypass line 28a using temperature sensor 27. Once the ice completely falls from freeze plate 22, the temperature of the refrigerant exiting evaporator 21 at outlet 21b will be much closer to or substantially equal to the temperature of the refrigerant entering evaporator 21 at inlet 21a. Therefore, even if some of the ice falls from freeze plate 22 and triggers harvest switch 58, but the temperature of the refrigerant exiting evaporator 21 at outlet 21b is lower than the temperature of the refrigerant entering evaporator 21 at inlet 21a, then ice still remains in freeze plate 22 and harvest is not yet complete.

At step 910, controller 80 checks to see whether both harvest sensor 58 has been triggered and whether the temperature of the refrigerant ($T_{out}$) exiting evaporator 21 via suction line 28d is substantially equal to the temperature of the refrigerant ($T_{in}$) entering evaporator 21 at inlet 21a via hot gas bypass line 28a.

After harvest sensor 58 has been triggered and $T_{out}$ is substantially equal to $T_{in}$, controller 80 determines that all of the ice has been harvested from freeze plate 22. Therefore, at step 914, controller 80 closes hot gas valve 24 thereby terminating the harvest portion of the ice making cycle. The making of a subsequent batch of ice can then begin in a new ice making cycle. Therefore, by monitoring when harvest sensor 58 is triggered and by monitoring $T_{out}$ and $T_{in}$, controller 80 can confirm that all of the ice in freeze plate 22 has been harvested.

While harvest sensor 58 is not triggered or $T_{out}$ is not substantially equal to $T_{in}$ at step 910, controller 80 loops back to optional step 904 to check whether the harvest time (t) measured by timer less than the maximum harvest time ($t_{max}$). If the harvest time (t) is less than the maximum harvest time ($t_{max}$), then the method cycles again through steps 906, 908, and 910. If however, the harvest time (t) is not less than maximum harvest time ($t_{max}$) (indicating that harvest time (t) is greater than or equal to the maximum harvest time ($t_{max}$)), then controller 80 may optionally indicate a potential harvest error at step 912 and will close hot gas valve at step 914. The potential harvest error may be indicated by an audible and/or visual alarm. In other embodiments, the potential harvest error may be sent by controller 80 to a remote location such as a computer or portable electronic device (e.g., smart phone, tablet, laptop computer, etc.). By closing hot gas valve when the maximum harvest time ($t_{max}$) is met or exceeded, damage to ice maker 110 from overheating may be avoided. The maximum harvest time ($t_{max}$) may be from about 30 seconds to about 10 minutes (e.g., about 30 seconds, about 45 seconds, about 1, minute, about 2 minutes, about 3 minutes, about 4 minutes, about 5 minutes, about 6 minutes, about 7 minutes, about 8 minutes, about 9 minutes, about 10 minutes). In various embodiments, the maximum harvest time ($t_{max}$) may be less than 30 seconds. In other embodiments, the maximum harvest time ($t_{max}$) may be more than 10 minutes. Preferably, the maximum harvest time ($t_{max}$) is about 5 minutes.

Figure 10:
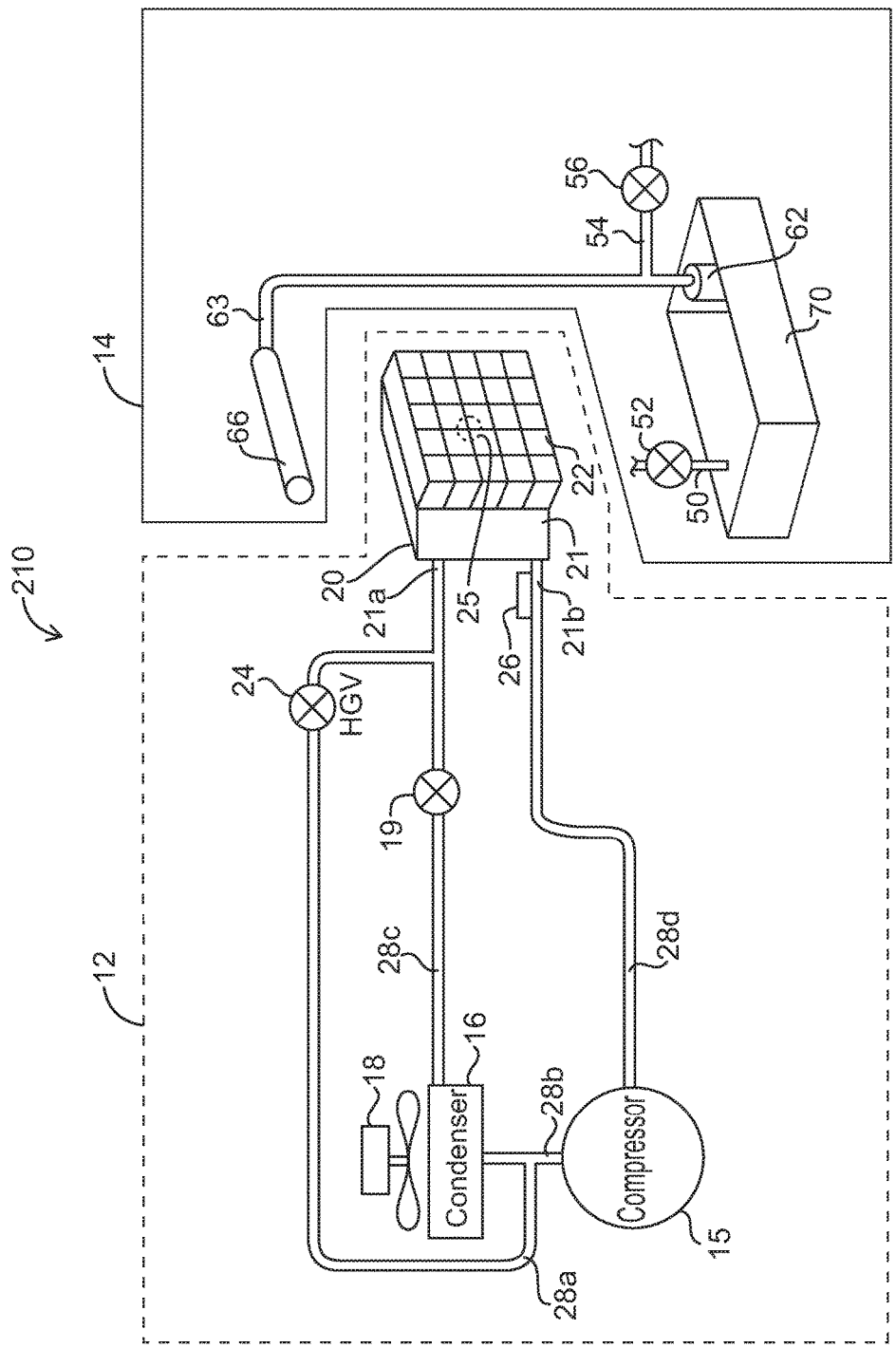
FIG. 10 is a schematic drawing of an ice maker having various components according to a third embodiment of the invention.

FIG. 10 illustrates another embodiments of an ice maker 210 that includes temperature sensor 25 to measure the temperature of freeze plate 22. By measuring the temperature of freeze plate 22, controller 80 can monitor the rise in temperature of freeze plate 22 and can compare the temperature of the freeze plate 25 ($T_{plate}$) to a set temperature ($T_{set}$) to confirm that all of the ice has been harvested from freeze plate 22.

Like temperature sensors 26 and 27, temperature sensor 25 is preferably a thermocouple located on or proximate freeze plate 22 which can measure the temperature of freeze plate 22. Preferably, temperature sensor 25 is affixed to the middle of the back side of freeze plate 22 opposite the grids where the ice is formed. It will be understood that temperature sensor 25 may include any type of temperature measuring device known in the art, including but not limited to, a thermocouple, a thermistor, a resistance temperature detector ("RTD"), a pyrometer, an infrared thermometer, etc. without departing from the scope of the disclosure.

Figure 11:
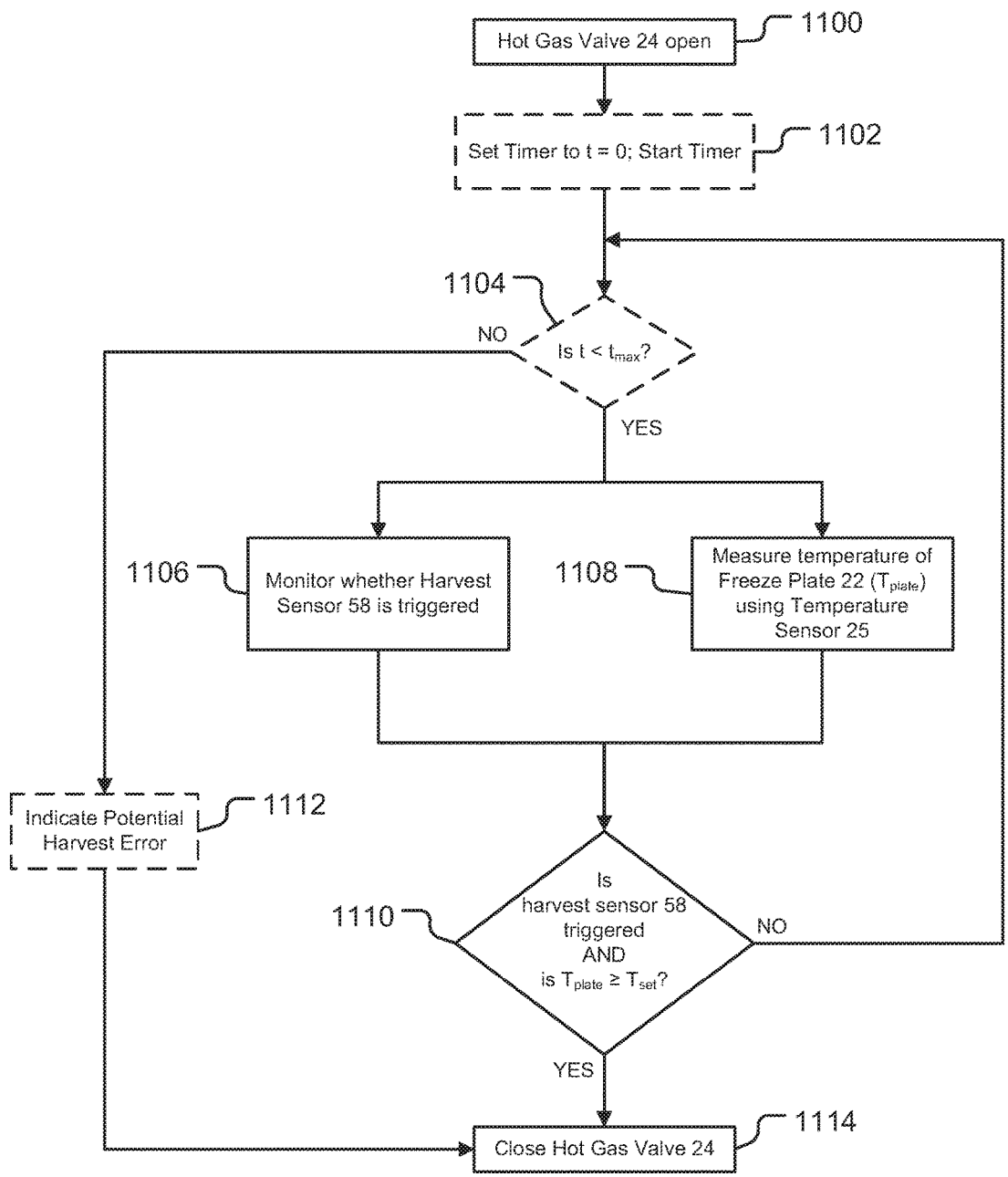
FIG. 11 is flow chart describing the harvest cycle operation of an ice maker according to the third embodiment of the invention.

With reference now to FIG. 11, a method of determining when harvest is complete with respect to ice maker 210 is described in detail. As described above, after the ice cubes are formed such that the desired ice cube thickness is reached, water pump 62 is turned off and the harvest portion of the ice making cycle is initiated by opening hot gas valve 24 at step 1100. Optionally, at step 1102 a timer is set to zero (0) and started. The timer is preferably implemented in controller 80 and may be used to time the harvest portion of the ice making cycle. The timer may be used as a fail-safe and can close hot gas valve 24 and/or shut off ice maker 210 in the event that the maximum harvest time ($t_{max}$) is reached as described in greater detail below. At optional step 1104, controller 80 checks to see whether the elapsed harvest time (t) is less than the maximum harvest time ($t_{max}$).

While the elapsed harvest time (t) is less than the maximum harvest time ($t_{max}$), controller 80 monitors whether harvest sensor 58 is triggered at step 1106. When the ice formed in freeze plate 22 melts to a degree such that at least a portion of the ice is released or harvested from freeze plate 22, the ice contacts door or flap 59 and triggers harvest sensor 58. Controller 80 thus receives as an input that harvest sensor 58 has been triggered. This indicates that at least a portion of the ice has been harvested.

At step 1108, controller 80 measures the temperature of freeze plate 22 ($T_{plate}$) using temperature sensor 25. Once the ice completely falls from freeze plate 22, the temperature of freeze plate 22 will be higher than the temperature of freeze plate 22 when ice still remains on freeze plate 22. Therefore, even if some of the ice falls from freeze plate 22 and triggers harvest switch 58, but the temperature of freeze plate 22 is lower than a set temperature ($T_{set}$), then ice still remains in freeze plate 22 and harvest is not yet complete.

At step 1110, controller 80 checks to see whether both harvest sensor 58 has been triggered and whether the temperature of freeze plate 22 ($T_{plate}$) is greater than or equal to a set temperature ($T_{set}$). The set temperature ($T_{set}$) may be stored in controller 80 and is the temperature of the freeze plate 22 that should be measured by temperature sensor 25 when all of the ice has been harvested from freeze plate 22. The set temperature ($T_{set}$) may be from about 40 degrees F. to about 60 degrees F. (e.g., about 40 degrees F., about 45 degrees F., about 50 degrees F., about 55 degrees F., about 60 degrees F.).

After harvest sensor 58 has been triggered and $T_{plate}$ is greater than or equal to the set temperature $T_{set}$, controller 80 determines that all of the ice has been harvested from freeze plate 22. Therefore, at step 1114, controller 80 closes hot gas valve 24 thereby terminating the harvest portion of the ice making cycle. The making of a subsequent batch of ice can then begin in a new ice making cycle. Therefore, by monitoring when harvest sensor 58 is triggered and by monitoring $T_{plate}$, controller 80 can confirm that all of the ice in freeze plate 22 has been harvested.

While harvest sensor 58 is not triggered or $T_{out}$ is less than $T_{set}$ at step 1110, controller 80 loops back to optional step 1104 to check whether the harvest time (t) measured by timer less than the maximum harvest time ($t_{max}$). If the harvest time (t) is less than the maximum harvest time ($t_{max}$), then the method cycles again through steps 1106, 1108, and 1110. If however, the harvest time (t) is not less than maximum harvest time ($t_{max}$) (indicating that harvest time (t) is greater than or equal to the maximum harvest time ($t_{max}$)), then controller 80 may optionally indicate a potential harvest error at step 1112 and will close hot gas valve at step 1114. The potential harvest error may be indicated by an audible and/or visual alarm. In other embodiments, the potential harvest error may be sent by controller 80 to a remote location such as a computer or portable electronic device (e.g., smart phone, tablet, laptop computer, etc.). By closing hot gas valve when the maximum harvest time ($t_{max}$) is met or exceeded, damage to ice maker 10 from overheating may be avoided. The maximum harvest time ($t_{max}$) may be from about 30 seconds to about 10 minutes (e.g., about 30 seconds, about 45 seconds, about 1, minute, about 2 minutes, about 3 minutes, about 4 minutes, about 5 minutes, about 6 minutes, about 7 minutes, about 8 minutes, about 9 minutes, about 10 minutes). In various embodiments, the maximum harvest time ($t_{max}$) may be less than 30 seconds. In other embodiments, the maximum harvest time ($t_{max}$) may be more than 10 minutes. Preferably, the maximum harvest time ($t_{max}$) is about 5 minutes.

While various steps are described herein in one order, it will be understood that other embodiments of the method can be carried out in any order and/or without all of the described steps without departing from the scope of the invention.

In addition to utilizing one or more of temperature sensors 25, 26, 27 as described herein to determine when the harvesting of ice is complete, controller 80 of ice makers 10, 110, 210 may also be able to use the input from one or more of temperature sensors 25, 26, 27 to determine whether harvest sensor 58 is malfunctioning or failing. For example, if harvest sensor 58 is not triggered but controller 80 determines that all of the ice has been harvested from freeze plate 22 based on the temperature(s) measured by one or more of temperature sensors 25, 26, 27, controller 80 may indicate that harvest sensor 58 is no longer working, is no longer being triggered by the ice as it is harvested, or that there is some other fault with one or more components of ice maker 10, 110, 210. Controller 80 may indicate such errors or faults by an audible and/or visual alarm. In other embodiments, the errors or faults may be sent by controller 80 to a remote location such as a computer or portable electronic device (e.g., smart phone, tablet, laptop computer, etc.).

Additionally, controller 80 may determine whether ice remains on freeze plate 22 at start-up of ice maker 10, 110, 210 based on the temperature(s) measured by one or more of temperature sensors 25, 26, 27. For example, if ice maker 10, 110, 210 unexpectedly shuts down during a cooling cycle or at the start of a harvest cycle ice may remain in freeze plate 22 when ice maker 10, 110, 210 restarts operation. Thus by measuring the temperature of the refrigerant exiting the evaporator ($T_{out}$) using temperature sensor 26 and/or the temperature of the freeze plate 22 ($T_{plate}$) using temperature sensor 25 at startup, controller 80 may determine whether any ice remains on freeze plate 22 and may initiate a harvest cycle by opening hot gas valve 24 to harvest any of the remaining ice. By harvesting any remaining ice upon start-up of ice maker 10, 110, 210, damage to ice maker 10, 110, 210 can be avoided from overheating of compressor 15, excessive weight on freeze plate 22, etc.

Although embodiments of ice maker 10, 110, and 210 described above utilize harvest sensor 58 which senses rotation of a door or flap 59 as it is hit by the harvested ice, it will be understood that any embodiment of ice maker of the disclosure can utilize any type of harvest sensor known in the art without departing from the scope of the invention. For example, in alternative embodiments, the harvest sensor may include, but are not limited to, a mechanical or mechanical/electrical relay, an electronic relay, an optical sensor, an audible sensor, a vibration sensor, an accelerometer, a rotational sensor, a proximity sensor, etc.

Figure 12:
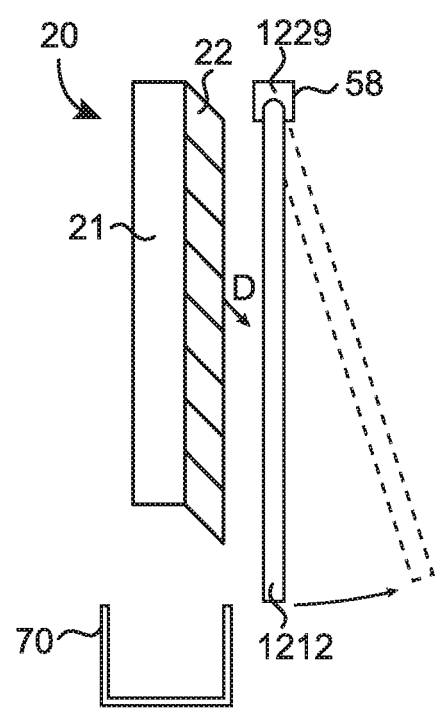
FIG. 12 is a left view of a harvest sensor according to another embodiment of the invention.

As shown in FIG. 12, a curtain 1212 may be located in front of and adjacent to freeze plate 22 of various embodiments of the ice maker. Curtain 1212 may be used to control the discharge of ice as it is harvested from freeze plate 22. Curtain 1212 may be normally disposed substantially parallel to freeze plate 22 and may rotate from a first position to a second position. When curtain 1212 is in the first position, curtain 1212 may assist in diverting unfrozen water from freeze plate 22 into sump 70. Then, when at least a portion of ice is harvested from freeze plate 22, the ice will extend out freeze plate 22 a distance along arrow D and hit curtain 1212 causing curtain 1212 to rotate to the second position.

In the particular embodiment illustrated in FIG. 12, harvest sensor 58 comprises curtain position sensor 1229. Curtain position sensor 1229 may sense when curtain 1212 is in the first position during the making of ice (i.e., a CURTAIN ICE MAKING POSITION) and when curtain 1212 is in the second position during harvesting of the ice (i.e., a CURTAIN HARVEST POSITION). Curtain position sensor 1229 may be electrically connected to controller 80 and can indicate to controller 80 that at least a portion of the ice has been harvested. Thus, in certain embodiments, for example, curtain position sensor 1229 may sense when curtain 1212 is in the first position or the second position by sensing rotation of curtain 1212. In other embodiments, for example, curtain position sensor 1229 may sense when curtain 1212 is in the first position or the second position by whether curtain 1212 contacts or is in proximity to curtain position sensor 1229. It will be understood that any type of curtain position sensor which can sense whether curtain 1212 is in the first position or the second position may be used without departing from the scope of the disclosure.

Figure 13:
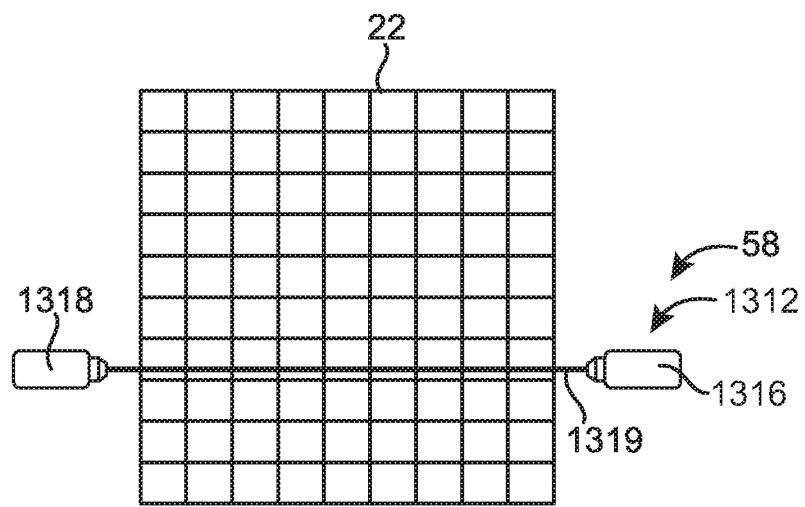
FIG. 13 is a front view of a harvest sensor according to a further embodiment of the invention.
Figure 13A:
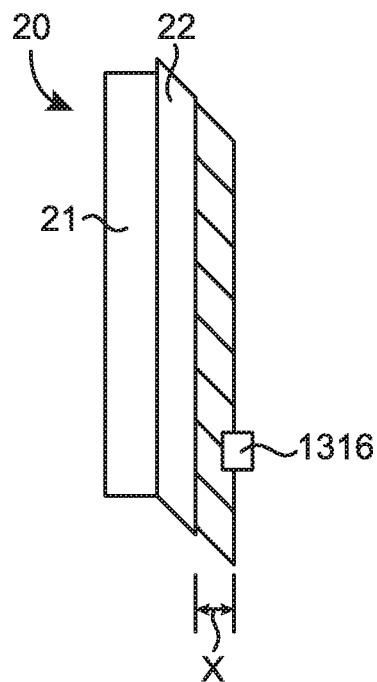
FIG. 13A is a front view of a harvest sensor according to a further embodiment of the invention.

In additional embodiments, as illustrated in FIGS. 13 and 13A, various embodiments of the ice maker may include a photoelectric sensor system 1312 that can detect that the ice has been harvested from freeze plate 22. Accordingly, in this embodiment harvest sensor 58 comprises photoelectric sensor system 1312. For example, photoelectric sensor system 1312 may be a through-beam type sensor system that includes transmitter 1316 disposed proximate a right side of freeze plate 22 and receiver 1318 disposed proximate a left side of freeze plate 22. Transmitter 1316 emits beam of light 1319 toward oppositely disposed receiver 1318. As shown in FIG. 13A, transmitter 1316 and receiver 1318 can be located a distance (x) from the front of freeze plate 22. The distance (x) can be equal to or less than the desired thickness of ice. For example, if the desired thickness of ice is 1.5 inches, the distance (x) may be 1.25 inches. Thus, as the ice is being harvested, the ice will emerge from freeze plate 22 and will break beam 1319 before the ice falls from freeze plate such that photoelectric sensor system 1312 senses that the ice has been harvested. Accordingly, photoelectric sensor system 1312 may be electrically connected to controller 80 and can indicate to controller 80 (see FIG. 2) that ice has been harvested. In accordance with the methods described herein, photoelectric sensor system 1312 can detect that at least a portion of the ice has been harvested from freeze plate 22.

While photoelectric sensor system 1312 is described as being located a distance (x) from the front of freeze plate 22, it will be understood that photoelectric sensor system 1312 can be located in any location that can detect that ice has been harvested. For example, in certain embodiments, a photoelectric sensor system can be located below freeze plate 22 and can detect that ice has been harvested by ice falling and breaking the beam. In other embodiments, for example, where the ice maker includes flap 59, a photoelectric sensor system can be located below flap 59 and the photoelectric sensor system can detect that ice has been harvested by ice falling and breaking the beam. Alternatively, for example, the photoelectric sensor system can detect that ice has been harvested by flap 59 breaking the beam as flap 59 moves downward. In other embodiments, for example, where the ice maker includes curtain 1212, a photoelectric sensor system can be located proximate curtain 1212 and the photoelectric sensor system can detect that ice has been harvested by curtain 1212 breaking the beam as curtain 1212 moves from the first position to the second position. It will also be understood that any type and/or construction of photoelectric sensor system may be used without departing from the scope of the invention including, but not limited to, a through-beam sensor system, a retroreflective system, a proximity-sensing or diffuse photoelectric sensor system, etc.

Thus, there has been shown and described novel methods and apparatuses of an ice maker wherein the completion of the harvest portion is confirmed by at least two sensors. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

What is claimed:

1. An ice maker for forming ice, the ice maker comprising:
   (i) a refrigeration system comprising a compressor, a condenser, an evaporator, a freeze plate thermally coupled to the evaporator, and a hot gas valve, wherein the compressor, condenser, and evaporator are in fluid communication by one or more refrigerant lines, and wherein a refrigerant cycles through the refrigerant lines;
   (ii) a water system for supplying water to the freeze plate wherein the water collects in the freeze plate and freezes into ice;
   (iii) a harvest sensor for detecting when at least a portion of the ice is harvested from the freeze plate;
   (iv) a first temperature sensor for measuring a temperature of the refrigerant exiting the evaporator;
   (v) a second temperature sensor for measuring a temperature of the refrigerant entering the evaporator; and
   (v) a controller adapted to close the hot gas valve in response to an indication from the harvest sensor that at least a portion of the ice has harvested from the freeze plate and the temperature measured by the first temperature sensor is substantially equal to the temperature measured by the second temperature sensor.

2. A method of controlling the harvesting of ice from an ice maker, the ice maker ice maker comprising: (i) a refrigeration system comprising a compressor, a condenser, an evaporator, a freeze plate thermally coupled to the evaporator, and a hot gas valve, wherein the compressor, condenser, and evaporator are in fluid communication by one or more refrigerant lines, and wherein a refrigerant cycles through the refrigerant lines; (ii) a water system for supplying water to the freeze plate wherein the water collects in the freeze plate and freezes into ice; (iii) a harvest sensor for detecting when at least a portion of the ice is harvested from the freeze plate; (iv) a first temperature sensor for measuring a temperature of the refrigerant exiting the evaporator; (v) a second temperature sensor for measuring a temperature of the refrigerant entering the evaporator; and (v) a controller adapted to close the hot gas valve in response to an indication from the harvest sensor that at least a portion of the ice has harvested from the freeze plate and the temperature measured by the first temperature sensor is substantially equal to the temperature measured by the second temperature sensor, the method comprising:
   (i) opening the hot gas valve to start harvesting ice from the freeze plate;
   (ii) receiving by the controller from the harvest sensor an indication that at least a portion of the ice has been harvested from the freeze plate;
   (iii) receiving by the controller an evaporator outlet temperature measurement from the first temperature sensor, wherein the evaporator outlet temperature measurement is the temperature of the refrigerant exiting the evaporator;
   (iii) receiving by the controller an evaporator inlet temperature measurement from the second temperature sensor, wherein the evaporator inlet temperature measurement is the temperature of the refrigerant entering the evaporator;
   (iv) determining by the controller whether the evaporator outlet temperature measurement is substantially equal to the evaporator inlet temperature measurement; and
   (v) closing the hot gas valve to terminate the harvesting of ice from the freeze plate when the evaporator outlet temperature measurement is substantially equal to the evaporator inlet temperature measurement.

* * * * *